L. LAMOREAUX AND R. J. BOOMER.
HITCH FOR POWER DUMP WAGONS.
APPLICATION FILED MAR. 15, 1920.
1,408,895.
Patented Mar. 7, 1922.
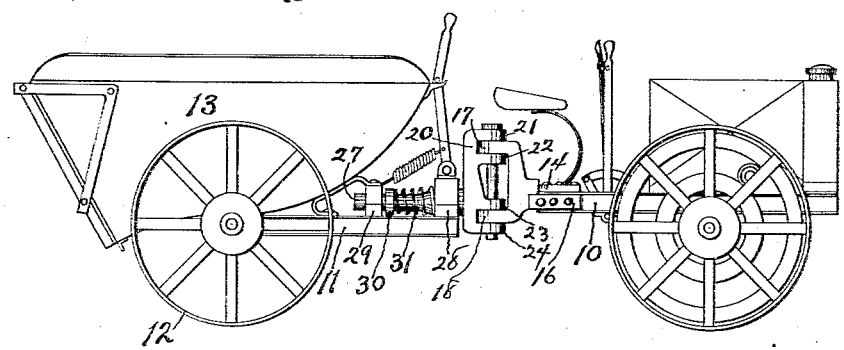
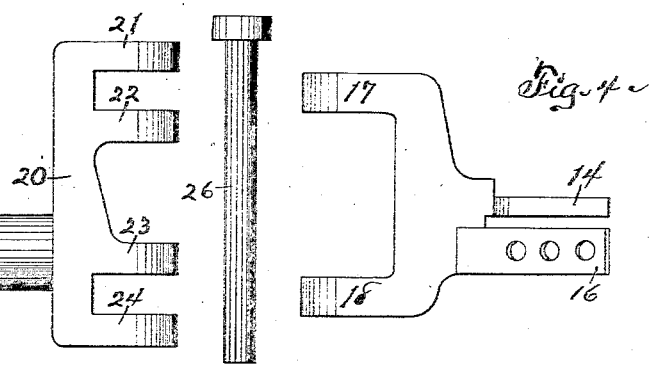
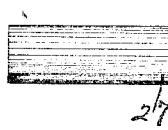
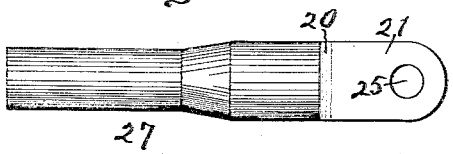
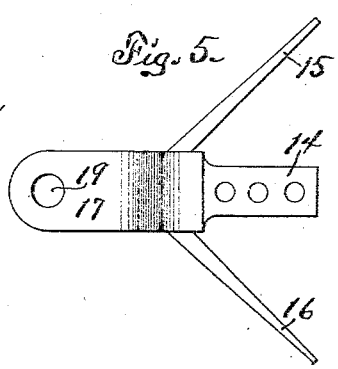
Inventors:
Leal Lamoreaux
Ralph J. Boomer.

UNITED STATES PATENT OFFICE.

LEAL LAMOREAUX AND RALPH J. BOOMER, OF WORTHINGTON, MINNESOTA.

HITCH FOR POWER DUMP WAGONS.

1,408,895.  Specification of Letters Patent.  Patented Mar. 7, 1922.

Application filed March 15, 1920. Serial No. 366,050.

*To all whom it may concern:*

Be it known that we, LEAL LAMOREAUX and RALPH J. BOOMER, each a citizen of the United States of America, and resident of Worthington, Nobles County, Minnesota, have invented a new and useful Hitch for Power Dump Wagons, of which the following is a specification.

The object of this invention is to provide improved means for connecting a tractor and a dumping vehicle in such manner that the vehicle may trail relative to the tractor and pivot on horizontal and vertical axes to accommodate said vehicle to irregular road surfaces and sinuous routes of travel.

A further object of this invention is to provide means for connecting a tractor and a dumping vehicle in such manner that the equilibrium of the vehicle relative to its truck may be maintained as desired while the vehicle is accomodating itself to travel on a sinuous path or over an uneven surface.

A further object of this invention is to provide a coupling between a tractor and a two wheeled vehicle, which coupling is inflexible horizontally and flexible on a vertical axis, the vehicle being adapted for pivotal movement relative to said coupling on a horizontal axis.

Our invention consists in the construction, arrangement and combination of elements hereinafter set forth, pointed out in the claims and illustrated by the accompanying drawing, in which—

Figure 1 is a side elevation showing our improved devices mounted as required for practical use. Figure 2 is a side elevation and Figure 3 a plan of one member of a coupling adapted to be secured to a dumping vehicle. Figure 4 is a side elevation and Figure 5 a plan of one member of a coupling adapted to be secured to a tractor. Figure 6 is a side elevation and Figure 7 a plan of a king-pin adapted to connect the members of the coupling for pivoting on a vertical axis. Figures 2 to 7 inclusive are on an enlarged scale.

In the construction and mounting of the devices as shown the numeral 10 designates generally a frame of a tractor, which tractor is shown conventionally. The numeral 11 designates generally the frame of a dump wagon, which dump wagon is shown conventionally and in this instance is carried by a cart truck having two wheels 12 suitably journaled on the frame. The dump wagon also has a dumping body 13, shown conventionally, and devices for latching the body in normal carrying position on the frame and means for dumping the contents of the body at the rear of the truck. The dump wagon is adapted to be drawn by the trailed relative to the tractor and it is desirable to provide means for retaining the frame 11 in such relation to the frame 10 as will prevent pivoting of said frame 11 on the axis of the wheels 12 to such an extent as to disturb the carrying function of the body 13. At the same time it is desirable to permit the frame 10 to pivot on a horizontal axis relative to the frame 11 to accommodate the cart in travel over irregular or uneven surfaces. At the same time it is desirable to provide means whereby the dump wagon may pivot on a vertical axis relative to the frame 10 to enable the dump wagon to trail relative to the tractor through a sinuous path, around corners and in reversing direction. To that end a coupling is provided having a member 14 adapted to overlie and be rigidly secured to the rear portion of the frame 10. The member 14 is further secured to the frame 10 by means of braces 15, 16. A yoke is formed on the member 14 and has upper and lower arms 17, 18 considerably spaced apart and formed with registering holes 19. The coupling is formed with a member 20 having flanges 21, 22, 23, 24 suitably spaced apart and adapted to over-lap and embrace in pairs the arms 17, 18 of the yoke, which flanges are formed with registering holes 25. A king pin 26 is adapted to be mounted vertically through registering holes 19 and 25 and connect the yoke and member 20 for pivotal movement on a vertical axis and at the same time prevent pivoting of said member relative to each other on a horizontal axis. A spindle 27 is fixed to and extends rearwardly from the member 20 substantially in the horizontal plane of the member 14 and said spindle is journaled in spaced bearings 28, 29 carried by the frame 11. A collar 30 is fixed to the spindle 27 between the bearings 28, 29 and an expensive coil spring 31 is mounted on said spindle between the bearing 28 and said collar and impinges at opposite ends thereon. It is the function of the spindle 27 and bearings 28, 29 to permit pivoting of the frame 11 on said spindle to accommodate the two-wheeled truck in travel over laterally uneven or irregular surfaces. Thus the dumping wagon may oscillate from side to side, but not horizontally, relative to the tractor frame. It is the function of the spring 31 to cushion the draft of the tractor on the dumping wagon.

We claim as our invention—

1. In a device of the class described, a tractor, a trailer and a coupling between said tractor and trailer, which coupling comprises a member rigidly secured to the tractor and formed with vertically spaced arms, a member having flanges embracing each of said arms, a king pin arranged vertically and pivotally connecting said arms and flanges, and a spindle on the latter member extending in the line of travel of the trailer and journaled therein for oscillation of said trailer on a longitudinal axis.

2. In a power dumping wagon, a tractor, a dumping wagon of the cart type and a coupling between said tractor and wagon, which coupling comprises a member rigidly secured to the tractor and formed with yoke arms in superposed relation, a member having flanges overlying said yoke arms, a king pin arranged vertically and pivotally connecting said yoke arms and flanges, and a spindle on the latter member extending in the line of travel of the wagon and pivoted thereto for oscillation of said wagon thereon on a horizontal axis coincident with said line of travel.

Signed at St. Paul, in the county of Ramsey and State of Minnesota, this 1st day of March, 1920.

LEAL LAMOREAUX.
RALPH J. BOOMER.